INVENTORS
D. M. LITTLE
G. R. HETTICK

ATTORNEYS

INVENTORS
D. M. LITTLE
G. R. HETTICK

ATTORNEYS

# United States Patent Office 3,551,102
Patented Dec. 29, 1970

3,551,102
RECOVERY OF AMMONIA AND SULFUR FROM WASTE STREAMS
George R. Hettick and Donald M. Little, Bartlesville, Okla., assignors to Phillips Petroleum Company, a corporation of Delaware
Filed Feb. 23, 1968, Ser. No. 707,862
Int. Cl. C01b 17/56; C01c 1/00
U.S. Cl. 23—193
9 Claims

ABSTRACT OF THE DISCLOSURE

Treatment of $H_2S$-$NH_3$-containing streams to recover ammonia and sulfur as products therefrom comprising oxidizing the $H_2S$ in the stream to $SO_2$ and reacting $SO_2$ and $H_2S$ to form free sulfur and obtaining an off-gas stream comprising $NH_3$, $N_2$, $CO_2$, $SO_2$ and $H_2O$ vapor which off-gas stream is preferably subjected to absorption by a sulfolane or a hydrocarbon for recovery of ammonia and recycle of $SO_2$ to the first step. As an alternative embodiment the off-gas stream is contacted with iron oxide to remove sulfur compounds prior to recovery of ammonia.

BACKGROUND OF THE INVENTION

Figure 1:
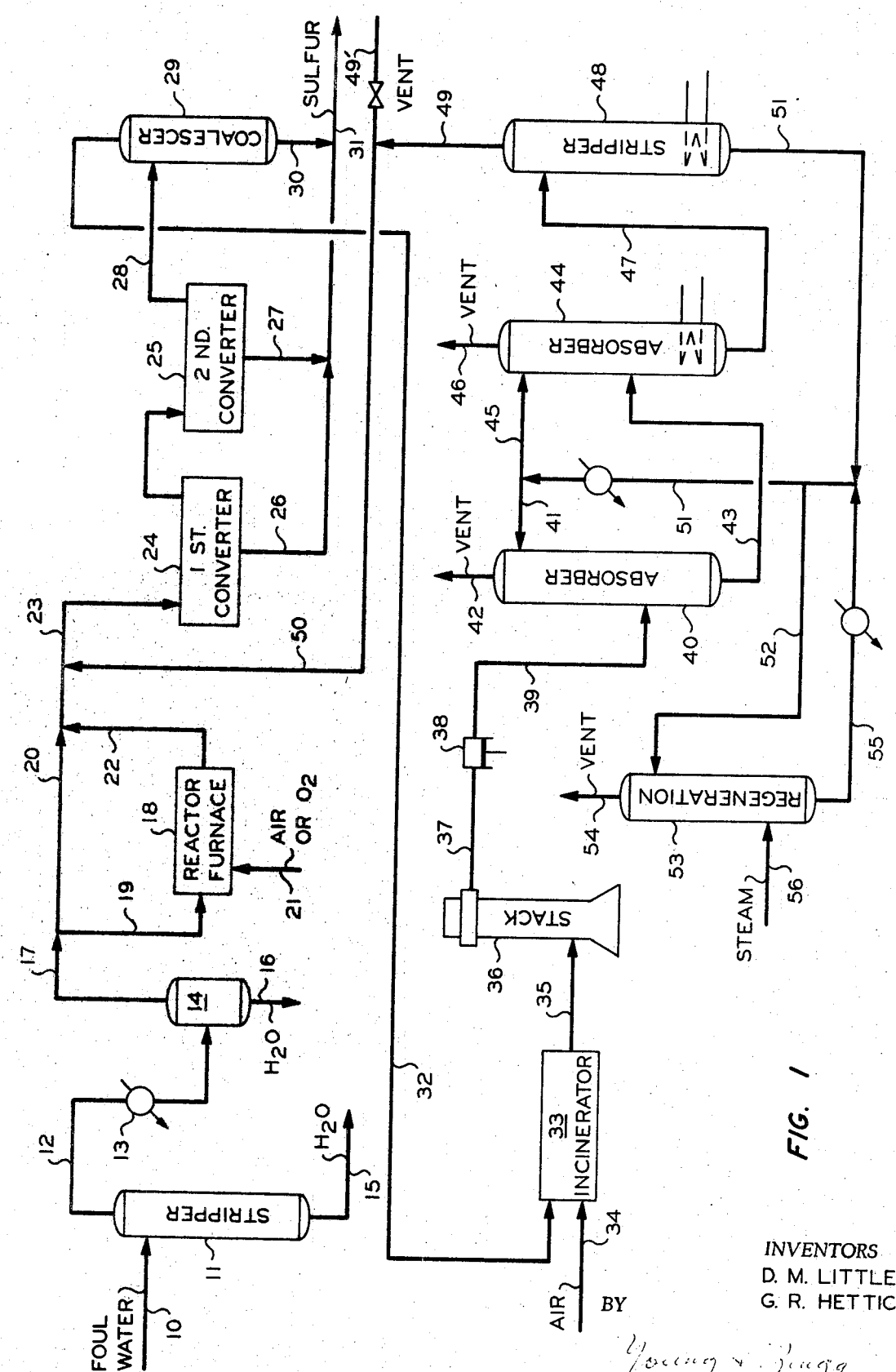

This invention relates to the recovery of ammonia and sulfur as products from an $H_2S$-$NH_3$-$H_2O$-containing stream such as that obtained on stripping foul water in order to purify same. In accordance with another aspect, this invention relates to a process for the recovery of ammonia from streams also containing $CO_2$, $SO_2$, $N_2$ and $H_2O$ vapor by absorption with a sulfolane. In accordance with the further aspect, this invention relates to a process for the recovery of $NH_3$ and sulfur as products from $H_2S$-$NH_3$-containing streams comprising converting the $H_2S$ present in said stream to $SO_2$ and free sulfur and treating the off-gas stream obtained therefrom comprising ammonia into $CO_2$, $SO_2$ and $H_2O$ vapor for extraction either with a sulfolane or a hydrocarbon and recycle of $SO_2$ to the initial step.

In many industrial processes, water is utilized in the process for various purposes, and subsequent to its use, the water contains dissolved therein objectionable materials which makes it undesirable to empty directly into streams. Many states have laws regulating the amount of waste which can be dumped and requiring various treatments. In present plant practices, these foul waters are treated to some extent prior to disposal of these waters from the industrial plant in order to not pollute streams and other water facilities. Such treatment of foul waters include steam stripping, flue gas stripping, air oxidation, biological treatment, chemical oxidation, extractions, settling, and combinations of these processes. One particular presently preferred method of treating foul waters is to subject them to stripping to remove therefrom various contaminants including $NH_3$ and $H_2S$.

The $NH_3$-$H_2S$ stream obtained from stripping of foul water contains valuable components which desirably can be recovered. In accordance with the invention a process has now been found wherein streams containing $H_2S$ and $NH_3$ such as that obtained upon stripping foul water in order to purify same can be subjected to treatment in a sulfur plant to convert $H_2S$ to $SO_2$ and sulfur and an off-gas stream containing ammonia and other contaminants is subjected to absorption to recover ammonia therefrom.

Acccordingly, an object of this invention is to provide a process for recovery of $NH_3$ and sulfur from streams containing $H_2S$-$NH_3$.

Another object of this invention is to provide a process for recovering valuable products from gaseous streams stripped from foul processed waters.

Other objects, aspects as well as the several advantages of this invention will be obvious to those skilled in the art upon further study of the specification, drawings and the appended claims.

SUMMARY OF THE INVENTION

In accordance with the invention, a process is provided for the recovery of $NH_3$ and sulfur as products from an $H_2S$-$NH_3$ containing stream such as that obtained upon stripping foul water in order to purify same comprising treating the stream in a sulfur plant to convert $H_2S$ to $SO_2$ and free sulfur, the latter being recovered as product, and treating an off-gas stream comprising $NH_3$, $N_2$, $CO_2$, $SO_2$ and $H_2O$ vapor in an absorption zone to recover ammonia as product.

In accordance with one embodiment of the invention, the off-gas obtained from the sulfur plant is contacted with a sulfolane which selectively extracts ammonia and $SO_2$ therefrom forming a sulfolane solvent phase rich in ammonia and $SO_2$ from which ammonia can later be separated leaving $SO_2$ in the sulfolane.

In a preferred embodiment, the sulfolane extraction is carried out in plural stages, the initial stages being at a lower temperature than the later stages wherein ammonia is released and $SO_2$ is retained with the sulfolane solvent. The $SO_2$ can be stripped from the sulfolane and returned to the sulfur plant for conversion to free sulfur.

In accordance with a further embodiment, the off-gas stream obtained from the sulfur plant is contacted with a hydrocarbon absorption medium, preferably an aromatic hydrocarbon which selectively removes $H_2S$ and $SO_2$ from the gas stream leaving the gas stream rich in $N_2$ and $NH_3$ which is washed with water to recover ammonia.

In accordance with a still further embodiment of the invention, the off-gas obtained from the sulfur plant is contacted with iron oxide to remove the sulfur compounds from the off-gas stream leaving a vent gas containing $NH_3$ and $N_2$ which is washed with water to recover ammonia. The iron oxide can be regenerated by oxidation to form $SO_2$ which can be returned to the sulfur plant for production of additional amounts of free sulfur.

DESCRIPTION OF PREFERRED EMBODIMENT

A better understanding of the invention will be obtained upon reference to the accompanying schematic drawings which illustrate presently preferred forms of the invention.

FIG. 1 diagrammatically illustrates the stripping of foul water to recover $NH_3$ and $H_2S$ therefrom, which stream is subjected to treatment in a sulfur plant to form sulfur and an off-gas obtained therefrom is further treated with sulfolane to recover ammonia as a further product.

Figure 2:
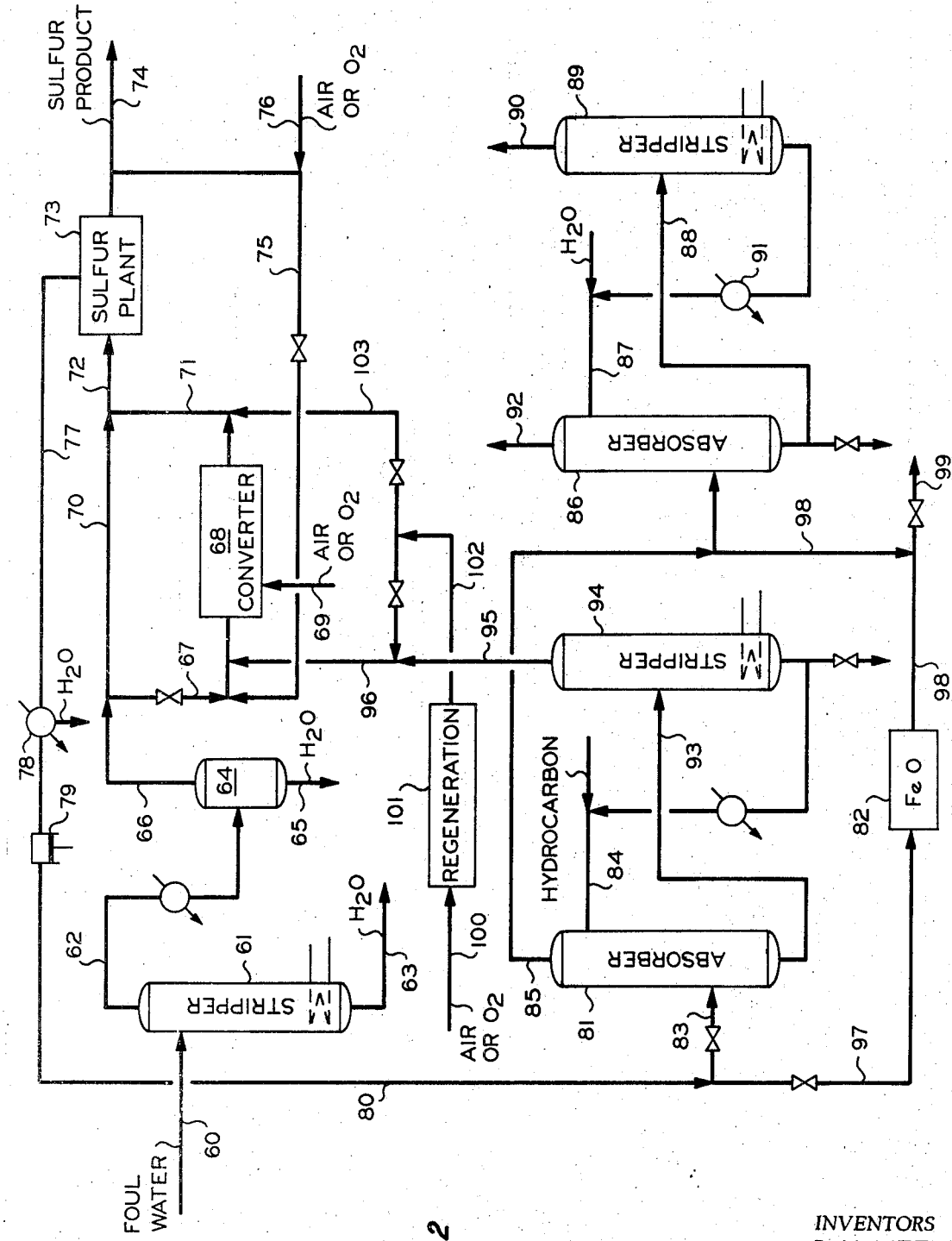

FIG. 2 diagrammatically shows another embodiment of the invention wherein foul water is stripped to obtain a stream containing $NH_3$ and $H_2S$, which stream is treated in a sulfur plant to produce sulfur product, and an off-gas obtained therefrom is treated either with a hydrocarbon to absorb sulfur compounds therefrom or treated with iron oxide to remove the sulfur compounds followed by water washing of, the off-gas stream containing $N_2$ and $NH_3$ to recover ammonia as an additional product.

Referring now to FIG. 1, foul water is introduced into stripper 11 by way of line 10. The foul water contains $NH_3$ and $H_2S$, as well as other gaseous contaminants. Water vapor, $NH_3$ and $H_2S$ are taken overhead from stripper 11 by way of line 12, passed to cooler 13 and introduced into water separator 14. Foul water which has been stripped of contaminants is removed by way of line 15 from stripper 11 and can be passed to steam production if desired. A water stream is also removed from the base of water separator 14 by way of line 16.

A stream comprising $NH_3$ and $H_2S$ is taken overhead from separator 14 by way of line 17 and passed either to furnace 18 by way of line 19 or by-pass of said furnace by way of line 20. If desired, all of stream 17 can be passed through reactor furnace 18 wherein $H_2S$ is oxidized to $SO_2$. Air is introduced into furnace by way of line 21. An effluent stream removed from reactor 18 comprising $SO_2$ is passed by way of line 22 and line 23 to sulfur converter 24.

Gas stream comprising $NH_3$, $H_2S$ and $SO_2$ is passed through a series of sulfur converters, 24 and 25, with sulfur being removed by way of lines 26 and 27, respectively. Effluent from the last converter is passed by way of line 28 to coalescer 29 wherein sulfur is removed by way of line 30 and combined with previous sulfur removal in lines 26 and 27 and removed from the system by way of line 31.

The operation of reactor furnace 18 and converters 24 and 25 is well known in the art and the conditions obtaining therein should be controlled so as to obtain the maximum amount of $SO_2$ and sulfur production from the stream being treated. Illustrative operating conditions of temperature, pressure and ratio of reactant and suitable catalyst are shown in the following Table I, illustrating FIG. 1.

TABLE I.—FOR FIG. 1

Operating conditions:
- (11) Foul water stripper:
  - Pressure, p.s.i.a. _____ 20
  - Temperature, ° F. _____ 250
- (14) Knock-out keg:
  - Pressure, p.s.i.a. _____ 18
  - Temperature, ° F. _____ 120
- (18) $SO_2$ generator:
  - Pressure, p.s.i.a. _____ 17
  - Temperature, ° F. _____ 1800
- (24) and (25) Sulfur zone:
  - Pressure, p.s.i.a. _____ 16
  - Temperature, ° F. (bauxite catalyst) ____ 700
- (29) Coalescer:
  - Pressure, p.s.i.a. _____ 16
  - Temperature, ° F. _____ 300
- (33) Incinerator:
  - Pressure, p.s.i.a. _____ 16
  - Temperature, ° F. _____ 1700
- (40) Absorber:
  - Pressure, p.s.i.a. _____ 17
  - Top temp., ° F. _____ 100
  - Bottom temp., ° F. _____ 110

Operating Conditions (Continued):
- (44) Absorber:
  - Pressure, p.s.i.a. _____ 16
  - Top temp., ° F. _____ 150
  - Bottom temp., ° F. _____ 180
- (48) $SO_2$ stripper:
  - Pressure, p.s.i.a. _____ 15
  - Top temp., ° F. _____ 180
  - Bottom temp., ° F. _____ 220
- (53) Regenerator:
  - Pressure, p.s.i.a. _____ 15
  - Top temp., ° F. _____ 220
  - Bottom temp., ° F. _____ 250

Table II, below, is a material balance illustrating the operation of FIG. 1.

TABLE II

| For Figure 1 (typical) stream component | Foul water (10) | Gas stream (12) | Gas to $SO_2$ generation (19) | Gas from $SO_2$ generation (22) | Recycle gas (50) | Gas feed to sulfur unit (23) | Sulfur product (31) | Air to incinerator (34) | Combustion products (39) |
|---|---|---|---|---|---|---|---|---|---|
| $NH_3$ | 2,170 | 2,070 | 690 | | | | | | 1,380 |
| $H_2S$ | 2,480 | 2,480 | 820 | | | | | | |
| $CO_2$ | 500 | 500 | 170 | 170 | | 170 | | | 500 |
| $H_2O$ vapor | | 200 | 70 | 1,530 | | 1,530 | | | 1,530 |
| $H_2O$ liquid | 494,850 | | | | | | | | |
| $SO_2$ | | | | 1,550 | 100 | 1,650 | | | 100 |
| Sulfur | | | | | | | 725 | | |
| $N_2$ | | | | 11,270 | | 11,270 | | 120 | 11,390 |
| $O_2$ | | | | | | | | 50 | |
| Sulfolane | | | | | | | | | |
| Total | 500,000 | 5,250 | 1,750 | 14,520 | 100 | 14,620 | 725 | 172 | 14,900 |

| For Figure 1 (typical) stream component | Vent gases (42) | Sulfolane (41) | Sulfolane (45) | Ammonia (46) | Recycle gas (50) | Sulfolane (52) | $H_2O$ vent (54) | Sulfolane (51) |
|---|---|---|---|---|---|---|---|---|
| $NH_3$ | | | | 1,380 | | | | |
| $H_2S$ | | | | | | | | |
| $CO_2$ | 500 | | | | | | | |
| $H_2O$ vapor | | 4,500 | 500 | | | | 1,530 | |
| $H_2O$ liquid | | | | | | | | |
| $SO_2$ | | | | | 100 | | | |
| Sulfur | | | | | | | | |
| $N_2$ | 11,390 | | | | | | | |
| $O_2$ | | | | | | | | |
| Sulfolane | | 450,000 | 50,000 | | | 50,000 | | 500,000 |
| Total | 11,890 | 454,000 | 50,500 | 1,380 | 100 | 50,000 | 1,530 | 500,000 |

An off-gas or waste gas stream is removed from coalescer 29 by way of line 32 and passed to incinerator 33. The waste gas stream comprises $NH_3$, $N_2$, $SO_2$ sulfur vapor, water vapor, but is substantially free of $H_2S$. Air is introduced into incinerator 33 by way of line 34. Incinerator 33 is operated ordinarily at a temperature in the range of 1500 to 1800° F. An effluent stream is removed from the incinerator which comprises $NH_3$, $N_2$, $SO_2$, $CO_2$ and $H_2O$ vapor by way of line 35, passed through stack 36, and then line 37, into compressor 38. The effluent removed from compressor 38 in line 39 is passed to absorber 40 wherein the gas stream is contacted with lean sulfolane introduced into an upper portion of absorber 40 by way of line 41. An overhead stream comprising unabsorbed $N_2$ and $CO_2$ is removed from absorber 40 by way of line 42. Absorber 40 is operated at a temperature of about 100° F.

A rich sulfolane stream containing $NH_3$, $SO_2$ and $H_2O$ is removed from the base of absorber 40 by way of line 43 and introduced into an intermediate portion of absorber 44. Additional lean sulfolane is introduced into absorber 44 by way of line 45. Absorber 44 is operated at a temperature of about 150° F. An overhead stream comprising $NH_3$ product is removed from absorber 44 by way of line 46.

The rich sulfolane liquid removed from the bottom of absorber 44 by way of line 47 is passed to $SO_2$ stripper 48 wherefrom $SO_2$ is removed overhead by way of line 49 and can be recycled to line 23 by way of line 50 for conversion to sulfur in the sulfur plant as previously described. Stripper 48 is operated at a temperature of about 180° F. The bottoms stream from stripper 48 in line 51 comprising water and sulfolane is passed to the sulfolane regenerator 53 by line 52 to strip out water overhead by line 54 and return lean sulfolane substantially freed of water to line 51 by way of line 55. Sulfolane regenerator 53 is operated at a temperature of about 220° F. and steam is introduced into the base of the regenerator by way of line 56.

Referring now to FIG. 2, foul water is introduced by way of line 60 into stripper 61. The foul water contains ammonia, $H_2S$, $CO_2$ and other contaminants. A gas stream comprising ammonia, $H_2S$, $CO_2$ is taken overhead by way of line 62 and a substantially purified water stream removed as bottoms by way of line 63 from stripper 61. The gas stream is cooled and passed to separator 64 wherein water is removed as bottoms by way of line 65 and an overhead gas stream of $NH_3$, $H_2S$, $CO_2$ and water vapor is removed by line 66.

In accordance with one operation of this gas stream, all or a part is passed by way of line 67 to $SO_2$ conversion unit 68, wherein gas stream is contacted with air or oxygen introduced by way of line 69 to oxidize $H_2S$ to $SO_2$. If desired, a portion of the gaseous stream in line 66 can by-pass $SO_2$ conversion unit 68 by way of line 70. An effluent stream containing $SO_2$ is removed from unit 68 by way of line 71 and then passed by way of line 72 to the sulfur plant 73. The sulfur plant is operated in the same manner as set forth above in connection with FIG. 1. Sulfur product is removed from plant 73 by way of line 74. If desired, a portion of the sulfur removed from plant 73 can be returned to $SO_2$ unit 68 by way of line 75 together with air or oxygen introduced by way of line 76.

An off-gas stream comprising $NH_3$, $H_2S$, $N_2$, $SO_2$, $H_2O$, sulfur vapor and $CO_2$ is removed from plant 73 by way of line 77, cooled to remove water by cooler 78, passed to compressor 79, and then passed through line 80 to either absorber 81 or iron oxide converter 82.

Off-gas in this embodiment is introduced into absorber 81 by way of line 83. Within absorber 81 the off-gas is contacted with a hydrocarbon solvent, preferably an aromatic hydrocarbon solvent such as benzene, by way of line 84. A vent gas stream is removed overhead from absorber 81 by way of line 85, which stream comprises $CO_2$, $N_2$, $NH_3$ and $H_2O$ and is passed to a second absorber 86. In absorber 86 water is introduced into upper portion by way of line 87 to remove $NH_3$ from the gaseous stream by way of line 88. The water stream containing ammonia is passed to stripper 89 wherein the ammonia is taken overhead by way of line 90 and water is removed as bottoms and returned by way of line 87 to absorber 86, following cooling in cooler 91. A stream comprising $N_2$ and $CO_2$ is removed overhead from absorber 86 by way of line 92 for further processing as desired.

Referring again to absorber 81, the hydrocarbon solvent absorbs the sulfur compounds including $H_2S$, free sulfur and $SO_2$, and is removed from the base of absorber 81 by way of line 93 and passed to stripper 94. The sulfur compounds in the solvent are removed overhead from stripper 94 by way of line 95 and returned by way of line 96 to the $SO_2$ conversion unit.

If desired, all or a portion of the off-gas in line 80 can be passed by way of line 97 to iron oxide treatment in unit 82. In unit 82 the iron oxide reacts with the hydrogen sulfide and other sulfur compounds and absorbs the sulfur. An effluent stream is removed from unit 82 by way of line 98 which effluent comprises $N_2$, $CO_2$, $NH_3$ and $H_2O$ which is passed to absorber 86. If desired, this effluent stream either all or in part if it contains $SO_2$ can be passed by way of line 99 for further processing as absorption with sulfolane as set forth in connection with FIG. 1.

After the iron oxide has been used for some time, it may be regenerated for further use by treating with air introduced by line 100 into regeneration unit 101. An effluent stream is removed from regeneration unit 101 by way of line 102 and returned either to the influent or effluent of $SO_2$ conversion unit 68 as desired by way of line 96 or 103. This stream contains $SO_2$ and other sulfur material.

Table III illustrates the operation of FIG. 2.

TABLE III

Operating conditions:
```
    (61)  Foul water stripper:
            Pressure, p.s.i.a. _____   20
            Temperature, ° F. _____  250
    (64)  Knock-out keg:
            Pressure, p.s.i.a. _____   18
            Temperature, ° F. _____  120
    (68)  SO₂ generator:
            Pressure, p.s.i.a. _____   17
            Temperature, ° F. _____ 1800
    (73)  Sulfur zone:
            Pressure, p.s.i.a. _____   16
            Temperature, ° F. (bauxite catalyst) ___  700
    (81)  Absorber:
            Pressure, p.s.i.a. _____   17
            Top temp., ° F. _____  100
            Bottom temp., ° F. _____  110
    (94)  Stripper:
            Pressure, p.s.i.a. _____   16
            Top temp., ° F. _____  220
            Bottom temp., ° F. _____  240
    (86)  Absorber:
            Pressure, p.s.i.a. _____   20
            Top temp., ° F. _____  100
            Bottom temp., ° F. _____  110
    (89)  Stripper:
            Pressure, p.s.i.a. _____   18
            Top temp., ° F. _____  200
            Bottom temp., ° F. _____  215
    (82)  Treating zone:
            Pressure, p.s.i.a. _____   20
            Temperature, ° F. _____  100
    (101) Regeneration zone:
            Pressure, p.s.i.a. _____   20
            Temperature, ° F. _____   80
```

Table IV, below, is a material balance illustrating the operation of FIG. 2.

TABLE IV

| Stream component | Foul water (60) | Recycle (102) | Feed to sulfur plant (72) | Sulfur product (74) | Off-gas (77) | Benzene (84) | Off-gas (85) | Off-gas (92) | Ammonia (90) |
|---|---|---|---|---|---|---|---|---|---|
| $NH_3$ | 2,170 | | | | 1,380 | | 1,380 | | 1,380 |
| $H_2S$ | 2,480 | | | | | | | | |
| $CO_2$ | 500 | | 170 | | 500 | | 500 | 500 | |
| $H_2O$ (vapor) | | | 1,530 | | 1,530 | | 1,530 | | |
| $H_2O$ (liquid) | 494,850 | | | | | | | | |
| $SO_2$ | | 100 | 1,550 | | 100 | | | | |
| Sulfur | | | | 725 | | | | | |
| $N_2$ | | | 11,270 | | 11,270 | | 11,270 | 11,270 | |
| $O_2$ | | | | | | | | | |
| Benzene | | | | | | 1,000,000 | | | |
| Total | 500,000 | 100 | 14,520 | 725 | 14,780 | 1,000,000 | 14,680 | 11,770 | 1,380 |

Sufficient solvent is used in the absorption systems to attain the desired recovery at minimum costs, and can be easily established by one skilled in the absorption art.

Examples of aromatic hydrocarbon solvents which can be used in our process include such as benzene, toluene, xylenes, ethyl benzene, propyl benzene, and the like, and admixtures thereof. Other hydrocarbon solvents include cycle oils such as produced by cracking hydrocarbons and aromatic extracts thereof.

The sulfolane solvents of the invention comprise tetrahydrothiophene-1,1-dioxide having the formula

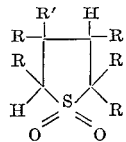

wherein each R is selected from hydrogen, methyl, and ethyl radicals, and R' is selected from hydrogen and alkoxy radicals having 1–5 carbon atoms. The simplest of these is sulfolane, $C_4H_8SO_2$.

Other known liquid solvents which can be used for removal of sulfur dioxide from gases include such as acetone, formic acid, and the like.

We claim:
1. A process for the separation and recovery of $NH_3$ from a gaseous stream containing $NH_3$, $CO_2$, $SO_2$, $N_2$, $H_2S$ and $H_2O$ vapor which comprises contacting said stream in an absorption zone with a sulfolane as an absorbent under absorption conditions to selectively extract $NH_3$ and $SO_2$ therefrom and form a sulfolane solvent phase rich in $NH_3$ and $SO_2$ and a gaseous stream containing unabsorbed materials comprising $CO_2$, $N_2$, $H_2S$ and some $NH_3$ and $SO_2$, and separating and recovering $NH_3$ from said sulfolane solvent phase by increasing the temperature of said solvent phase to remove $NH_3$ therefrom and leaving $SO_2$ in the sulfolane solvent phase.

2. A process according to claim 1 wherein said absorption is carried out in plural stages at different temperatures wherein the first stage is at a lower temperature than later stages so as to selectively absorb $NH_3$ and $SO_2$ from said gaseous stream with the solvent in the first stage and separating and removing $NH_3$ from the solvent in the latter stages which are operated at a higher temperature, leaving $SO_2$ in the solvent phase, and desorbing $SO_2$ from the solvent phase.

3. A process according to claim 1 for the recovery of ammonia and sulfur as products from an $H_2S$-$NH_3$-$H_2O$-containing stream obtained upon stripping foul water in order to purify same which comprises:
(a) passing said stream to a sulphur plant and oxidizing $H_2S$ in said stream to form $SO_2$ and reacting unreacted $H_2S$ with $SO_2$ to produce free sulfur and water and removing free sulfur thus produced as product from the process,
(b) obtaining from said sulfur plant an off-gas stream comprising $NH_3$, $N_2$, $CO_2$, $SO_2$ and $H_2O$ vapor,
(c) passing said stream obtained in step (b) to a solvent extraction zone wherein said stream is contacted with a sulfolane under absorption conditions to selectively absorb $NH_3$ and $SO_2$ therefrom and form a sulfolane solvent phase rich in $NH_3$ and $SO_2$ and leaving an unabsorbed stream comprising $N_2$ and $CO_2$,
(d) desorbing absorbed ammonia from the solvent phase by increasing the temperature and leaving $SO_2$ in said sulfolane solvent phase and recovering ammonia as product,
(e) further increasing the temperature of said sulfolane solvent phase reduced in $NH_3$ content to desorb $SO_2$ therefrom, and
(f) recycling desorbed $SO_2$ to said sulfur plant for the production of additional amounts of free sulfur as product.

4. A process according to claim 3 wherein said absorption zone comprises a two-stage absorption operated at different temperatures, the first stage being at a lower temperature than the second stage, whereby $NH_3$ and $SO_2$ are absorbed in the first stage and ammonia is desorbed overhead from the solfolane in the second higher temperature stage, and further wherein $SO_2$ is desorbed from the sulfolane in a stripping zone.

5. A process according to claim 4 wherein the bottoms stream comprising water and sulfolane is removed from said stripping zone and is subjected to further stripping for removal of water and return of substantially dry sulfolane as absorbent to the process for recovery of additional amounts of ammonia and $SO_2$ for reuse in the process.

6. A process according to claim 4 wherein said first stage is operated at about 100° F. and about atmospheric pressure and said second stage is operated at least about 50° higher than said first stage and at about atmospheric pressure.

7. A process for the recovery of sulfur and $NH_3$ from a gaseous $H_2S$-$NH_3$-containing stream obtained upon stripping foul water in order to purify same which comprises:
(a) passing said gaseous stream through a sulfur plant wherein $H_2S$ is oxidized to $SO_2$ and unreacted $H_2S$ is reacted with $SO_2$ to form free sulfur which is removed as product,
(b) producing an off-gas stream in step (a) comprising $NH_3$, $N_2$, $CO_2$, unreacted $H_2S$, sulfur vapor, and $SO_2$,
(c) passing said off-gas stream to an absorption zone wherein said stream is contacted with a hydrocarbon solvent that selectively removes $H_2S$ and $SO_2$ therefrom and leaves a gas stream rich in $N_2$ and $NH_3$ and which latter gas stream is washed with water to remove ammonia as product, and
(d) recovering $H_2S$ and $SO_2$ by stripping same from said solvent removed in step (c) and returning same to step (a).

8. A process according to claim 7 wherein step (c) is an absorption zone employing an aromatic hydrocarbon as a solvent that selectively absorbs $H_2S$ and $SO_2$ therefrom and leaves a gas stream rich in $N_2$ and $NH_3$ which is washed with water to remove $NH_3$ as product therefrom and step (d) is a desorption step wherein $H_2S$ and $SO_2$ are desorbed from the aromatic hydrocarbon and returned to step (a).

9. A process according to claim 7 wherein step (c) employs iron oxide to remove sulfur compounds and leave a vent gas which is washed with water to recover ammonia as product therefrom, and (d), the iron oxide is regenerated by oxidation to form $SO_2$ which is returned to step (a).

References Cited
UNITED STATES PATENTS

| | | | |
|---|---|---|---|
| 1,880,741 | 10/1932 | Boswell | 23—226 |
| 2,992,076 | 7/1961 | Thompson et al. | 23—225 |
| 3,050,370 | 8/1962 | Urban et al. | 23—226 |
| 3,338,664 | 8/1967 | Bally et al. | 23—2 |

OSCAR R. VERTIZ, Primary Examiner

H. S. MILLER, Assistant Examiner

U.S. Cl. X.R.

23—2, 178, 181, 225, 270; 55—40, 68, 70, 73